United States Patent
Kakadia et al.

(10) Patent No.: US 9,185,001 B2
(45) Date of Patent: Nov. 10, 2015

(54) BACKHAUL NETWORK PERFORMANCE MONITORING USING SEGMENTED ANALYTICS

(71) Applicants: Verizon Patent and Licensing Inc., Arlington, VA (US); Cellco Partnership, Arlington, VA (US)

(72) Inventors: Deepak Kakadia, Union City, CA (US); Thomas H. Tan, San Jose, CA (US); Courtney D. Drewski, Walnut Creek, CA (US); Emerando M. Delos Reyes, Pleasant Hill, CA (US); Donna L. Polehn, Kirkland, WA (US)

(73) Assignees: Verizon Patent and Licensing Inc., Basking Ridge, NJ (US); Cellco Partnership, Basking Ridge, NJ (US)

( * ) Notice: Subject to any disclaimer, the term of this patent is extended or adjusted under 35 U.S.C. 154(b) by 437 days.

(21) Appl. No.: 13/854,763

(22) Filed: Apr. 1, 2013

(65) Prior Publication Data

US 2014/0293804 A1    Oct. 2, 2014

(51) Int. Cl.
*H04L 12/26* (2006.01)
*H04L 12/24* (2006.01)

(52) U.S. Cl.
CPC .......... *H04L 41/145* (2013.01); *H04L 43/106* (2013.01); *H04L 43/12* (2013.01); *H04L 41/06* (2013.01)

(58) Field of Classification Search
CPC ... H04L 1/0025; H04L 1/0026; H04L 1/0027; H04L 1/06; H04L 1/145; H04L 43/12; H04L 43/106
See application file for complete search history.

(56) References Cited

U.S. PATENT DOCUMENTS

| | | | | |
|---|---|---|---|---|
| 6,611,867 | B1* | 8/2003 | Bowman-Amuah | 709/224 |
| 7,136,357 | B2* | 11/2006 | Soumiya et al. | 370/236 |
| 8,185,651 | B2* | 5/2012 | Moran et al. | 709/235 |
| 8,213,444 | B1* | 7/2012 | Harris et al. | 370/412 |
| 8,358,577 | B1* | 1/2013 | Khanka et al. | 370/221 |
| 8,495,207 | B2* | 7/2013 | Lee | 709/224 |
| 2007/0010271 | A1* | 1/2007 | Roy | 455/517 |

(Continued)

OTHER PUBLICATIONS

International Telecommunication Union, "Series G: Transmission Systems and Media, Digital Systems and Networks; Packet over Transport Aspects—Ethernet over Transport aspects; Series Y: Global Information Infrastructure, Internet Protocol Aspects and Next-generation Networks; Internet Protocol Aspects—Operation, Administration and Maintenance," G.8013/Y.1731, Jul. 2011.

(Continued)

*Primary Examiner* — Curtis A Alia
*Assistant Examiner* — Emmanuel Maglo (57) ABSTRACT

A system may be configured to monitor traffic associated with a network device; determine a time at which a particular portion of traffic was received by the network device; identify one or more attributes associated with the particular portion of the traffic; determine one or more performance indicators associated with the particular portion of the traffic; and determine that an alert threshold has been met. The determining may be based on at least one of: the one or more attributes or the one or more performance indicators. The system may output, based on determining that the alert threshold has been met, information regarding the time at which the particular portion of the traffic was received by the network device, the one or more attributes, and the one or more performance indicators associated with the particular portion of the traffic.

20 Claims, 10 Drawing Sheets

(56) References Cited

U.S. PATENT DOCUMENTS

| | | | |
|---|---|---|---|
| 2008/0046266 A1* | 2/2008 | Gudipalley et al. | 705/1 |
| 2010/0123575 A1* | 5/2010 | Mittal et al. | 340/540 |
| 2010/0238887 A1* | 9/2010 | Koodli et al. | 370/329 |
| 2010/0265876 A1* | 10/2010 | Foxworthy et al. | 370/316 |
| 2011/0044173 A1* | 2/2011 | Kakadia et al. | 370/238 |
| 2011/0314145 A1* | 12/2011 | Raleigh et al. | 709/224 |
| 2012/0076016 A1* | 3/2012 | Robbins et al. | 370/252 |
| 2013/0090121 A1* | 4/2013 | Zhang et al. | 455/450 |
| 2013/0242781 A1* | 9/2013 | Hui et al. | 370/252 |

OTHER PUBLICATIONS

International Telecommunication Union, "Series G: Transmission Systems and Media, Digital Systems and Networks; Packet over Transport Aspects—Ethernet over Transport aspects; Series Y: Global Information Infrastructure, Internet Protocol Aspects and Next-generation Networks; Internet Protocol Aspects—Operation, Administration and Maintenance," G.8013/Y.1731 Amendment 1, May 2012.

International Telecommunication Union, "Series G: Transmission Systems and Media, Digital Systems and Networks; Packet over Transport Aspects—Ethernet over Transport aspects; Series Y: Global Information Infrastructure, Internet Protocol Aspects and Next-generation Networks; Internet Protocol Aspects—Operation, Administration and Maintenance," G.8013/Y.1731 Corrigendum 1, Oct. 2011.

* cited by examiner

| Timestamp | IP Src | IP Dest | Port Src | Port Dest | PID | Bearer ID | KPIs |
|---|---|---|---|---|---|---|---|
| t1 | 1.1.1.1 | 1.1.1.2 | 21 | 8892 | 0x0101 | 0x01 | •••  ••• <br> •••  ••• |
| t1 | 2.2.2.2 | 2.2.2.3 | 20 | 1234 | 0x0202 | 0x02 | •••  ••• <br> •••  ••• |
| t2 | 3.3.3.3 | 3.3.3.4 | 88 | 5555 | 0x0303 | 0x03 | •••  ••• <br> •••  ••• |

BACKHAUL NETWORK PERFORMANCE MONITORING USING SEGMENTED ANALYTICS

BACKGROUND

A network, such as a telecommunications network, may include a core network and several "edge" networks, such as radio access networks ("RANs"). The core network may communicate with the RANs via intermediate links, such as via a backhaul network. The backhaul network may, in some instances, be provided by a backhaul service provider to a service provider associated with the core network. The service provider of the backhaul network may provide certain guarantees, such as quality of service ("QoS") guarantees, regarding the capabilities (e.g., throughput, latency, and/or reliability) of the backhaul network. The service provider of the core network may pay certain rates for certain levels of guarantees, and may wish to verify that these levels of guarantees are being met.

DETAILED DESCRIPTION OF PREFERRED EMBODIMENTS

The following detailed description refers to the accompanying drawings. The same reference numbers in different drawings may identify the same or similar elements.

Figure 1:
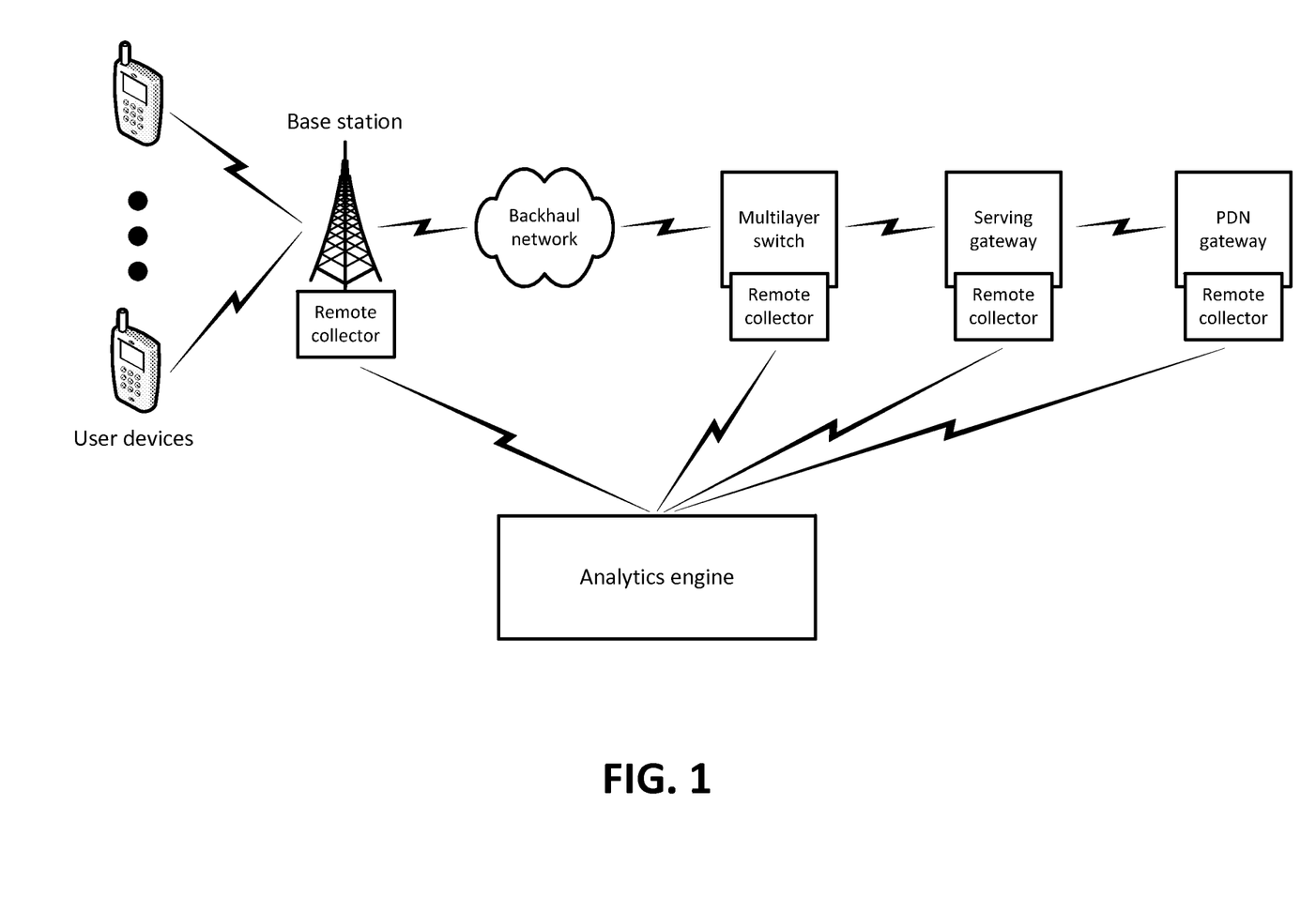
FIG. 1 illustrates an overview of one or more example implementations described herein.

Techniques described herein may allow for granular and accurate testing of performance of a backhaul network. FIG. 1 illustrates an overview of one or more example implementations described herein. As shown in FIG. 1, a set of user devices (e.g., wireless telephones) may be in communication with a base station (e.g., a base station associated with a cellular telecommunications network). The base station may communicate with network devices associated with a core network via a backhaul network. For instance, as shown in FIG. 1, the base station may communicate with a multilayer switch ("MLS"), serving gateway ("SGW"), and packet data network gateway ("PGW"), associated with the core network, via the backhaul network.

As also shown in FIG. 1, the base station, MLS, SGW, and PGW may each be associated with a remote collector. Each particular remote collector may monitor traffic sent and/or received by the respective associated network device. For example, when monitoring traffic, a remote collector may identify traffic attributes (e.g., source and/or destination addresses, source and/or destination ports, packet identifiers, etc.). A remote collector may also determine performance information (e.g., key performance indicators ("KPIs"), such as throughput, latency, etc.) associated with the respective associated network device. As further shown in FIG. 1, the remote collectors may output information regarding the traffic attributes and/or the KPI information to an analytics engine. For example, as described below, the remote collectors may output the information to the analytics engine when bandwidth is available to output the information, and/or when certain thresholds are met (e.g., whether performance has fallen below a particular threshold, when an urgent event is detected, etc.).

In some implementations, the analytics engine may aggregate the received information in order to determine meaningful performance information. For example, the analytics engine may be capable of determining segment-by-segment and/or end-to-end information regarding a particular packet by aggregating information, regarding the packet, received from multiple remote collectors associated with multiple network devices through which the packet has traversed. As another example, the analytics engine may be capable of determining segment-by-segment and/or end-to-end information regarding traffic associated with a particular bearer channel, a particular source and/or destination device, etc.

By aggregating information received from remote collectors, which are each associated with respective network devices, the analytics engine may be able to provide granular (e.g., segment-by-segment) performance information (e.g., throughput per segment). Such granular information may be useful when identifying issues with particular segments in a network (e.g., performance issues, such as jitter or packet fragmentation). In some implementations, analytics engines may be distributed in a hierarchical fashion, which may allow for performance monitoring of multiple networks (e.g., multiple area networks associated with a core network). Additionally, analytics engines may be deployed at an area level (e.g., one analytics engine for multiple mobile switching centers ("MSCs")), as opposed to test devices which may traditionally be deployed on a per-MSC basis.

Furthermore, by analyzing actual traffic that is sent and/or received by network devices, the analytics engine of some implementations may be able to test performance of the backhaul network without introducing additional traffic into the backhaul network, thus saving network resources compared to implementations in which test packets are used to test the backhaul network. Additionally, by monitoring packet attributes (e.g., packet identifiers), some implementations may be able to identify packet loss (e.g., if a packet is received by one network device but not another). Also, the analytics engine of some implementations may be able to identify latency based on timestamps generated by remote collectors.

Figure 2:
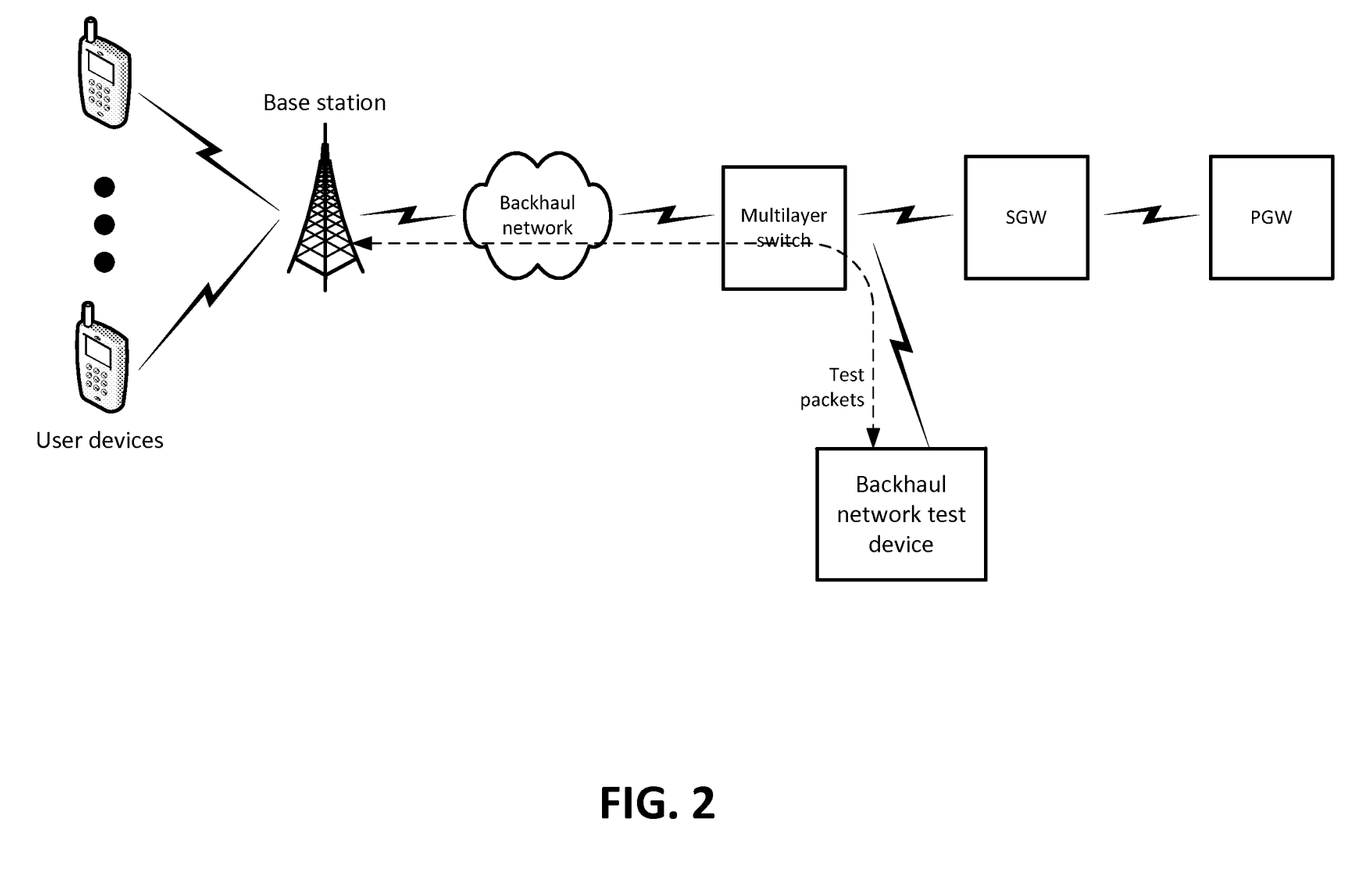
FIG. 2 illustrates potential shortcomings with using a backhaul network test device.

Further still, analyzing actual traffic may aid in avoiding situations where backhaul network service providers recognize test packets, and may potentially use the test packets to artificially increase the measured performance of the backhaul network. An example of such a situation is illustrated in FIG. 2, in which a backhaul network test device may measure the performance of the backhaul network by sending a test packet via the backhaul network (e.g., as described in the International Telecommunication Union ("ITU") Y.1731 standard). The base station may send a response to the test frame to the backhaul network test device, which may determine KPI information based on the response. As mentioned above, a service provider of the backhaul network may recognize the test frame (e.g., may analyze a header associated with the test frame in order to determine that the test frame is a test frame according to the ITU Y.1731 standard). The service provider of the backhaul network may grant a higher QoS to such test frames, than is ordinarily granted to other traffic, in order to artificially boost KPI information associated with the backhaul network. As mentioned above, by forgoing sending test frames (and instead monitoring actual traffic), some implementations may more accurately be able to test backhaul network performance. Furthermore, while the Y.1731 standard allows for testing level 2 communications, some implementations described herein may allow for testing of different (e.g., higher) level communications (e.g., by using packets that include IP addresses).

Figure 3:
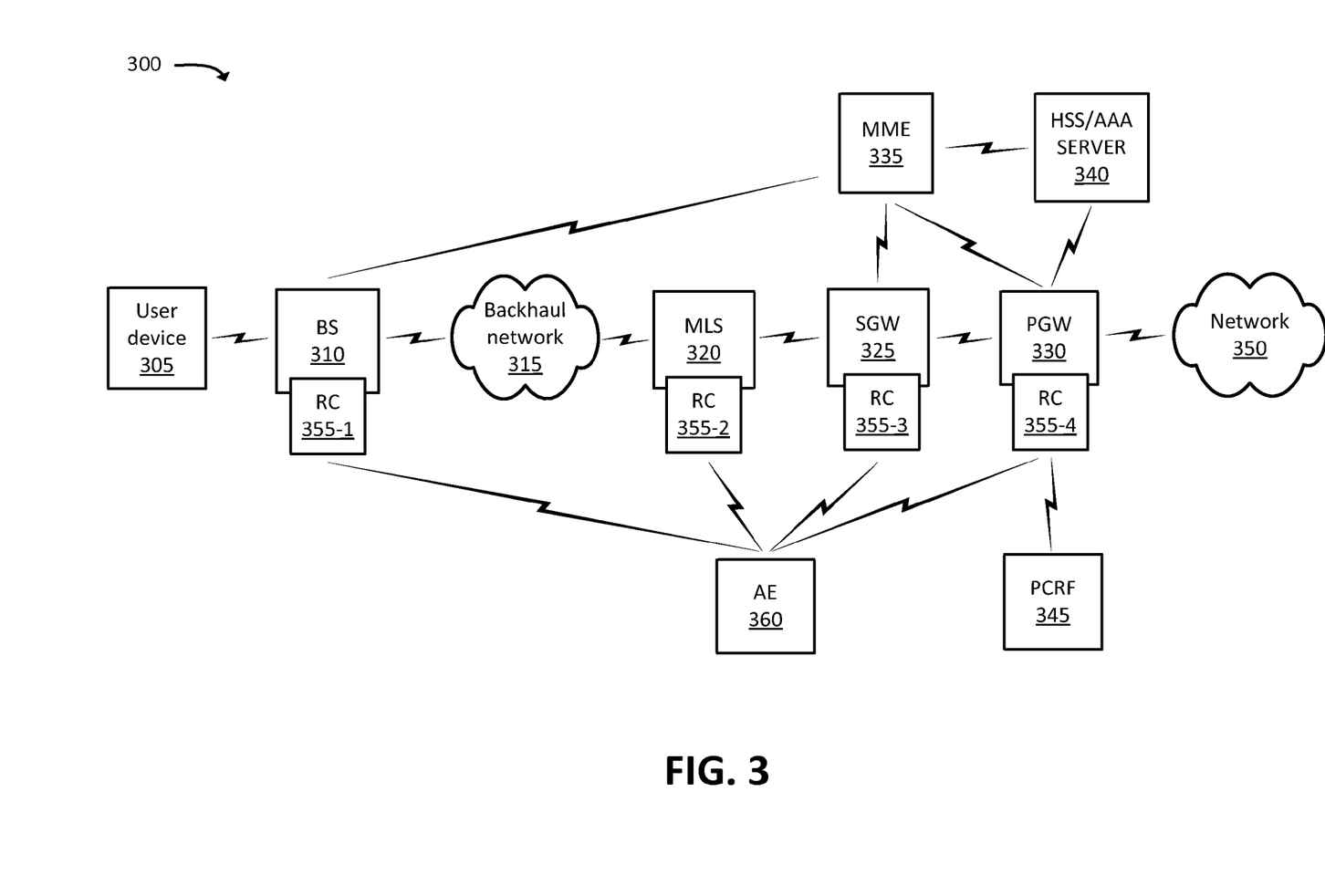
FIG. 3 illustrates an example environment in which systems and/or methods, described herein, may be implemented.

FIG. 3 illustrates an example environment 300, in which systems and/or methods described herein may be implemented. As shown in FIG. 3, environment 300 may include user device 305, base station 310 (which may, in some implementations, take the form of an evolved node B ("eNB")), backhaul network 315, MLS 320, serving gateway ("SGW") 325, packet data network ("PDN") gateway ("PGW") 330, mobility management entity device ("MME") 335, home subscriber server ("HSS")/authentication, authorization, accounting ("AAA") server 340 (hereinafter referred to as "HSS/AAA server 340"), policy charging and rules function ("PCRF") 345, network 350, remote collectors 355-1 through 355-4 (hereinafter referred to collectively as "remote collectors 355," or individually as "remote collector 355"), and analytics engine 360.

The quantity of devices and/or networks, illustrated in FIG. 3, is provided for explanatory purposes only. In practice, there may be additional devices and/or networks; fewer devices and/or networks; different devices and/or networks; or differently arranged devices and/or networks than illustrated in FIG. 3. Alternatively, or additionally, one or more of the devices of environment 300 may perform one or more functions described as being performed by another one or more of the devices of environment 300. Devices of environment 300 may interconnect via wired connections, wireless connections, or a combination of wired and wireless connections.

Environment 300 may include an evolved packet system ("EPS") that includes a LTE network and/or an evolved packet core ("EPC") network that operate based on a third generation partnership project ("3GPP") wireless communication standard. The LTE network may be, or may include, a RAN that includes one or more base stations 310, some or all of which, may take the form of an eNB, via which user device 305 may communicate with the EPC network. The EPC network may include one or more SGWs 325, MMEs 335, and/or PGWs 330, and may enable user device 305 to communicate with network 350 and/or an Internet protocol ("IP") multimedia subsystem ("IMS") core network. The IMS core network may include HSS/AAA server 340, and may manage authentication, session initiation, account information, a user profile, etc. associated with user device 305.

User device 305 may include any computation and communication device, such as a wireless mobile communication device that is capable of communicating with base station 310 and/or network 350. For example, user device 305 may include a radiotelephone; a personal communications system ("PCS") terminal (e.g., a device that combines a cellular radiotelephone with data processing and data communications capabilities); a personal digital assistant ("PDA") (e.g., that can include a radiotelephone, a pager, Internet/intranet access, etc.); a smart phone; a laptop computer; a tablet computer; a camera; a personal gaming system, or another type of mobile computation and communication device. User device 305 may send traffic to and/or receive traffic from network 350 via base station 310, backhaul network 315, MLS 320, SGW 325, and/or PGW 330.

Base station 310 may include one or more network devices that receive, process, and/or transmit traffic, such as calls, audio, video, text, and/or other data, destined for and/or received from user device 305. In one example, base station 310 may be an eNB device and may be part of the LTE network. Additionally, or alternatively, one or more other base stations 310 may be associated with a RAN that is not associated with the LTE network (e.g., a wireless hot spot, a wireless access point, etc.). Base station 310 may receive traffic from and/or send traffic to network 350 via SGW 325 and PGW 330. Base station 310 may send traffic to and/or receive traffic from user device 305 via an air interface.

Backhaul network 315 may include one or more networking devices (e.g., routers and/or switches) and links (e.g., fiber or coaxial links), that connect respective base station 310 to a core network (e.g., a core network that includes MLS 320, SGW 325, and/or PGW 330). In some implementations, access to the backhaul network may be provided by a particular service provider, to a different service provider, who is associated with SGW 325, PGW 330, and/or network 350. Access to backhaul network 315 may be provided with QoS guarantees, such as a minimum guaranteed throughput, a maximum guaranteed latency, a minimum guaranteed reliability, and/or other QoS guarantees.

MLS 320 may include one or more network devices that perform switching functionality on traffic received from SGW 325 and/or backhaul network 315. MLS 320 may operate multiple layers of the Open Systems Interconnection ("OSI") reference model, in contrast with other switches that traditionally operate only on the Data Link Layer ("DLL"). For example, MLS 320 may perform deep packet inspection to perform routing functions.

SGW 325 may include one or more network devices that gather, process, search, store, and/or provide information in a manner described herein. SGW 325 may, for example, aggregate traffic received from one or more base stations 310 and may send the aggregated traffic to network 350 via PGW 330.

PGW 330 may include one or more network devices that gather, process, search, store, and/or provide information in a manner described herein. PGW 330 may aggregate traffic received from one or more SGWs 325, etc. and may send the aggregated traffic to network 350. PGW 330 may also, or alternatively, receive traffic from network 350 and may send the traffic toward user device 305 via SGW 325 and/or base station 310.

MME 335 may include one or more computation and communication devices that perform operations to register user device 305 with the EPS, to establish bearer channels associated with a session with user device 305, to hand off user device 305 from the EPS to another network, to hand off user device 305 from the other network to the EPS, and/or to perform other operations. MME 335 may perform policing operations on traffic destined for and/or received from user device 305.

HSS/AAA server 340 may include one or more server devices that manage, update, and/or store, in a memory associated with HSS/AAA server 340, profile information associated with a subscriber. The profile information may identify applications and/or services that are permitted for and/or accessible by the subscriber; a mobile directory number ("MDN") associated with the subscriber; bandwidth or data rate thresholds associated with the applications and/or services; information associated with the subscriber (e.g., a username, a password, etc.); rate information; minutes allowed for a subscriber; and/or other information. The subscriber may be associated with user device 305 and/or one or more other user devices 305. Additionally, or alternatively, HSS/AAA server 340 may perform authentication, authorization, and/or accounting operations associated with the subscriber and/or a communication session with user device 305.

PCRF 345 may include one or more server devices that aggregate information to and from the EPC network and/or other sources. PCRF 345 may receive information regarding policies and/or subscriptions from one or more sources, such as subscriber databases and/or from one or more users (such as, for example, an administrator associated with PCRF 345).

Network 350 may include one or more wired and/or wireless networks. For example, network 350 may include a packet data network ("PDN"), such as an IP-based PDN. Network 350 may include, for example, a wide area network such as the Internet, or one or more other networks. User device 305 may connect, through PGW 330, to data servers, application servers, or to other servers/applications that are coupled to network 350.

Remote collectors 355 may monitor traffic received and/or sent by network devices. For example, remote collector 355-1 may monitor traffic received and/or sent by base station 310, remote collector 355-2 may monitor traffic received and/or sent by MLS 320, remote collector 355-3 may monitor traffic received and/or sent by SGW 325, and remote collector 355-4 may monitor traffic received and/or sent by PGW 330. As described further below, remote collectors 355 may analyze monitored traffic to determine traffic attributes and KPI information associated with the respective network device, and may provide the information to analytics engine 360. In some implementations, one remote collector 355 may receive information from another remote collector 355, in order to determine KPI information. For example, as described further below, remote collector 355-2 may receive information from remote collector 355-1 regarding a particular packet, and may determine one or more KPIs based on this information (e.g., by comparing a time that remote collector 355-1 received the packet and a time that remote collector 355-2 received the packet, remote collector 355-2 may be able to provide latency information regarding the packet, which may provide insight into the performance of backhaul network 315).

While remote collectors 355 are illustrated as separate devices in FIG. 3, in some implementations, one or more of remote collectors may be implemented at least partially as software within another device. For example, in some such implementations, remote collector 355-1 may be implemented at least partially as software being executed on hardware associated with base station 310.

Analytics engine 360 may receive information (e.g., traffic attribute information and/or KPI information) from remote collectors 355. As described further below, analytics engine 360 may aggregate information received from multiple remote collectors 355, in order to generate useful information regarding traffic. As also described below, this information may provide performance and/or other information regarding the end-to-end flow of traffic, as well as performance and/or other information regarding the flow of traffic within certain segments (e.g., between particular network devices).

In some implementations, analytics engine 360 may communicate with remote collectors 355 over existing communication links That is, while analytics engine 360 is conceptually illustrated in FIG. 3 as being connected to each of remote collector 355-1 through 355-4, in practice, the actual communication paths between remote collectors 355 and analytics engine 360 may be different than the illustrated path. For example, in some implementations, analytics engine 360 may be communicatively coupled to PGW 330 via network 350. In some such implementations, for example, remote collector 355-1 may communicate with analytics engine 360 via backhaul network 315, MLS 320, SGW 325, PGW 330, and/or any other intervening devices. In other implementations, one or more remote collectors 355 may include one or more other communication links to analytics engine 360.

In some implementations, the data sent from remote collectors 355 to analytics engine 360 may be of a relatively low priority, such that this data does not preempt user data (e.g., data sent to and/or from user device 305). For example, remote collectors 355 may set a priority flag, of sent data, to be lower than priority that is associated with user data. For instance, remote collectors 355 may set the priority flag to a lowest possible priority. In some situations, such data may be referred to as "bulk data," or as being associated with a "scavenger class." As described below, in some situations, remote collectors 355 may elevate priority of data sent to analytics engine 360 (e.g., in cases where urgent events may occur). As may be apparent from the above discussion, in some implementations, the information sent from remote collectors 355 to analytics engine 360 may include information regarding packets, without including all packet information. For instance, remote collector 355 may provide a portion or entirety of header information, of a particular packet, to analytics engine 360, without providing some or all of the payload (or content) information, of the particular packet, to analytics engine 360.

Figure 4:
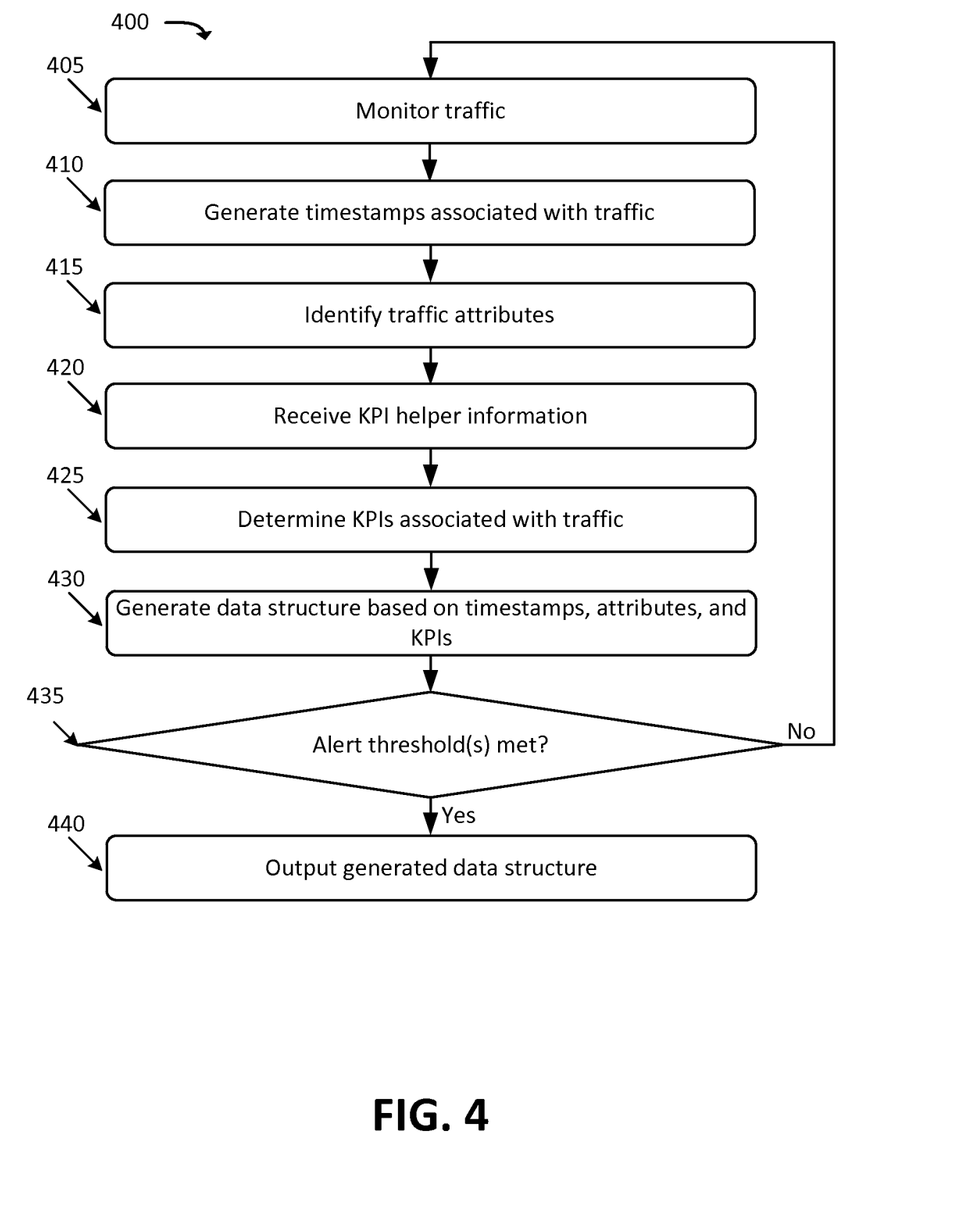
FIG. 4 illustrates an example process for testing performance of a segment of a network.

FIG. 4 illustrates an example process 400 for testing performance of a segment of a network. In one example implementation, process 400 may be performed by remote collector 355. In other implementations, some or all of process 400 may be performed by one or more other devices in lieu of, or in conjunction with, remote collector 355.

Process 400 may include monitoring traffic (block 405). For example, a particular remote collector 355 may monitor traffic associated with a particular network device. For instance, remote collector 355-1 may monitor traffic associated with base station 310, remote collector 355-2 may monitor traffic associated with MLS 320, remote collector 355-3 may monitor traffic associated with SGW 325, and/or remote collector 355-4 may monitor traffic associated with PGW 330. In some implementations, remote collector 355 may buffer, or otherwise store, a copy of the traffic sent and/or received by its respective corresponding network device, in order to perform analysis on the traffic without delaying the processing of the traffic by the respective corresponding network device.

Process 400 may also include generating timestamps associated with the monitored traffic (block 410). For example, assume that, when monitoring traffic (at block 405), remote collector 355-1 identifies that a packet has been received by base station 310. Remote collector 355-1 may identify a time at which the packet was received by base station 310, and may generate a timestamp based on the identified time.

Process 400 may further include identifying attributes of the monitored traffic (block 415). These attributes may include, for example, a source address (e.g., a source Internet Protocol ("IP") address), a destination address (e.g., a destination IP address), a source port, a destination port, a packet identifier ("PID"), one or more bearer identifiers, or other information associated with the traffic.

In some implementations, remote collector 355 may inspect received packets (e.g., may inspect headers and/or payloads of packets), in order to identify traffic attributes. In some implementations, remote collector 355 may identify traffic attributes in additional, or alternative, ways. For instance, remote collector 355-4, associated with PGW 330, may receive information (e.g., IP Flow Information Export ("IPFIX") information) that may be used to associate bearers with IP addresses.

Process 400 may additionally include receiving KPI helper information (block 420). For example, remote collector 355 may receive information, based on which remote collector 355 may determine one or more KPIs associated with the traffic. Remote collector 355 may receive KPI helper information from another remote collector 355, and/or from another source.

In some implementations, the KPI helper information, received from another remote collector 355, may include information identifying received packets (e.g., PIDs, IP addresses, and/or other identifying information) and timestamps, identifying when the packets were received by a network device associated with the other remote collector 355. As described below, remote collector 355 may determine KPIs, such as latency between network devices respectively associated with remote collector 355 and the other remote collector 355, loss of packets between network devices respectively associated with remote collector 355 and the other remote collector 355, or other KPIs.

Process 400 may further include determining KPIs associated with the traffic (block 425). For instance, remote collector 355 may determine KPIs, such as latency, packet fragmentation, packet jitter, loss of packets, and/or other KPIs. As described above, in some implementations, remote collector 355 may use KPI helper information (received at block 420) when determining KPIs. For example, based on timestamps associated with a particular packet (e.g., a timestamp in the helper information and the timestamp generated at block 410), remote collector 355 may determine a latency between a particular network device and the network device associated with remote collector 355. As another example, remote collector 355 may determine whether packets have been lost. For example, if the KPI helper information indicates that a packet was received by a first network device, and the packet has not been received by another network device, associated with remote collector 355, within a threshold amount of time, remote collector 355 may determine that the packet has been lost.

In some implementations, remote collector 355 may determine KPIs without helper information received from another source. For instance, remote collector 355 may determine a measure of the extent of fragmentation of packets (e.g., proportion or quantity of received packets that are fragmented, quantity of fragments per packet, etc.). As another example, remote collector 355 may determine packet jitter based on, for example, a difference in time between packets received by the network device associated with remote collector 355.

Process 400 may also include generating a data structure based on the timestamps, traffic attributes, and KPIs (block 430). In some implementations, remote collector 355 may generate the data structure in a buffered manner. For example, remote collector 355 may store information regarding monitored traffic over a particular duration of time (e.g., the last one second, the last one minute, the last thirty minutes, or another duration of time), the most recent packets monitored (e.g., the last twenty packets monitored, the last 100 packets monitored, the last 1,000 packets monitored, or another quantity of packets), etc., and may discard older information.

Figure 5:
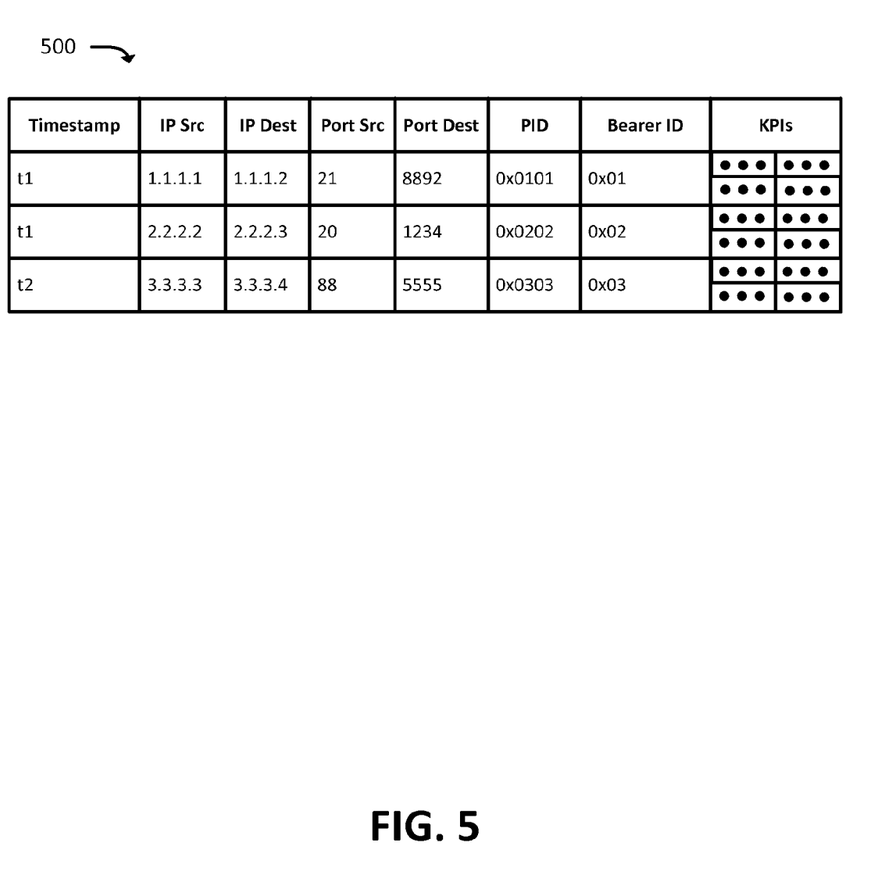
FIG. 5 illustrates an example data structure that may be generated by a remote collector, according to one or more implementations.

FIG. 5 illustrates an example data structure 500 that may be generated (at block 430) by remote collector 355. As shown, data structure 500 may include information regarding traffic, such as a timestamp (generated at block 410), as well as traffic attribute information (identified at block 415), such as a source IP address ("IP Src"), a destination IP address ("IP Dest"), a source port ("Port Src"), a destination port ("Port Dest"), a PID, a bearer identifier ("Bearer ID"), and KPIs associated with the traffic (determined at block 425).

While an example of data structure 500 is shown in FIG. 5, in practice, data structure 500 may include additional, fewer, different, or differently arranged information. For example, in some implementations, data structure 500 may include information regarding an identifier for a device from which traffic is received or to which traffic is destined (e.g., user device 305), such as an International Mobile Station Equipment Identity ("IMEI") number, an International Mobile Subscriber Identity ("IMSI") number, a Subscriber Identity Module ("SIM") number, and/or another user device identifier. Additionally, while data structure 500 is shown as taking the form of a table, in practice, data structure may include another type of data structure, such as a linked list, a hash table, a tree, and/or another data structure.

Returning to FIG. 4, process 400 may further include determining whether one or more alert thresholds have been met (block 435). In some implementations, these alert thresholds may be based on one or more of the KPIs determined at block 425. Additionally, or alternatively, the alert thresholds may be based on other performance information, such as available bandwidth or utilization (e.g., bandwidth available or utilized on a link between remote collector 355 and analytics engine 360). Additionally, or alternatively, the alert thresholds may be based on a QoS level associated with traffic monitored by remote collector 355. In some implementations, the alert thresholds may be configurable (e.g., by an administrator associated with remote collector 355 and/or analytics engine 360).

In one example, a particular set of alert thresholds may specify that the alert thresholds are met when remote collector 355 determines that a particular quantity or proportion of packets are experiencing greater than a particular amount of latency, jitter, loss, and/or fragmentation. The particular set of thresholds may also specify that the alert thresholds are met when the available bandwidth on a link between remote collector 355 and analytics engine 360 exceeds a particular bandwidth.

In some implementations, certain thresholds may be associated with more urgent alerts. In these situations, the amount of available bandwidth specified may be different than when less urgent alert conditions occur. For instance, a relatively major alert may occur when packet latency is very high (e.g., above a particular threshold latency). When such a relatively major alert occurs, the amount of available bandwidth specified by the alert thresholds may be lower than the amount of available bandwidth specified when a less major alert occurs (e.g., when packet latency is lower than the particular threshold latency, but higher than another threshold latency).

If one or more alert thresholds have been met (block 435—YES), then process 400 may include outputting the generated data structure (block 440). For example, remote collector 355 may output the data structure (generated at block 430) to analytics engine 360 and/or to another device. In some implementations, remote collector 355 may assign a priority (e.g., a QoS class) to communication to analytics engine 360, which includes the data structure. In some implementations, the priority may be based on how major the alert is (e.g., as specified in the alert thresholds evaluated at block 435). A relatively minor alert may be assigned a relatively low QoS class (e.g., a "scavenger class" or "bulk data" QoS class), while a more major alert may be assigned a higher QoS class. When outputting the generated data structure, remote collector 355 may also output information identifying the network device with which remote collector 355 is associated (e.g., a device identifier, an IP address, and/or other identifying information).

If, on the other hand, one or more alert thresholds have not been met (block 435—NO), then process 400 may proceed to block 405. For instance, remote collector 355 may continue to monitor traffic (at block 405) if alert thresholds have not been met. In this manner, remote collector 355 may continuously monitor traffic, may continuously determine whether alert thresholds have been met, and may output a data structure with meaningful information when alert thresholds have been met.

Figure 6:
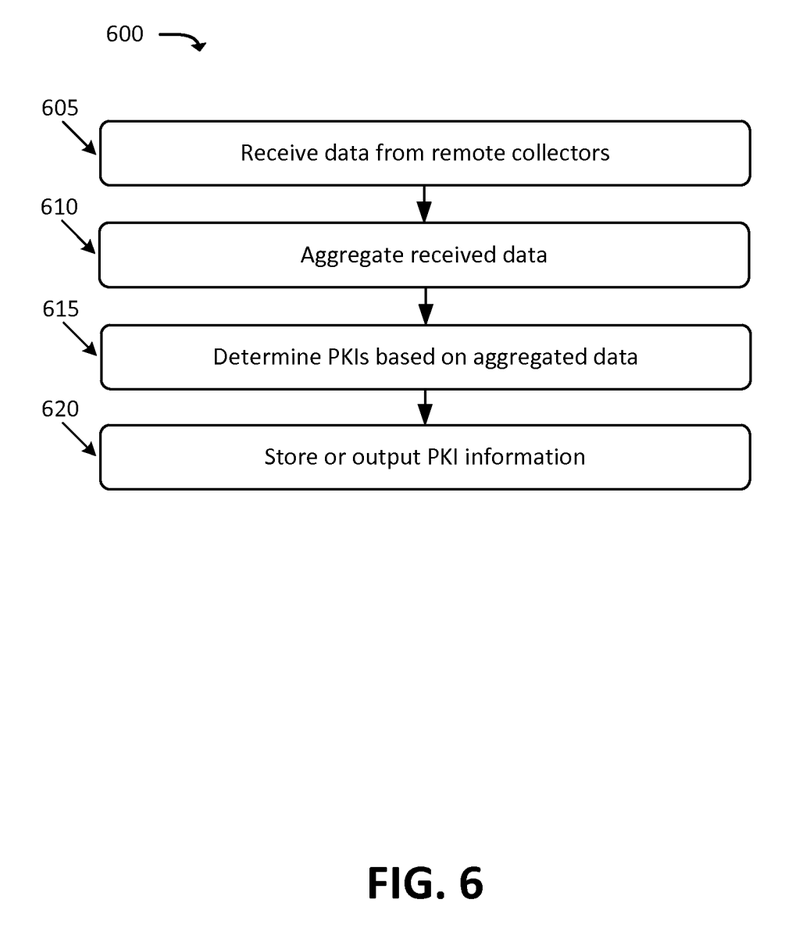
FIG. 6 illustrates an example process for aggregating performance information regarding multiple segments of a network.

FIG. 6 illustrates an example process 600 for aggregating performance information regarding multiple segments of a network. In one example implementation, process 600 may be performed by analytics engine 360. In other implementations, some or all of process 600 may be performed by one or more other devices in lieu of, or in conjunction with, analytics engine 360.

Process 600 may include receiving data from remote collectors (block 605). For example, analytics engine 360 may receive data from one or more remote collectors 355. This data may correspond to, for example, data structures generated by remote collectors 355 at block 440 of process 400. As mentioned above, these data structures may take the form of data structure 500, and/or may include similar information as the information shown in FIG. 5. In some implementations, analytics engine 360 may passively receive the data from remote collectors 355 (e.g., without requesting the data). In some implementations, analytics engine 360 may request the data from one or more remote collectors 355 (e.g., in response to automatically detecting an event, on a periodic basis, in response to a manual request from an administrator, etc.). As mentioned above, the data received from remote collectors 355 may include information identifying from which remote collector 355 the data was received.

Figure 7A:
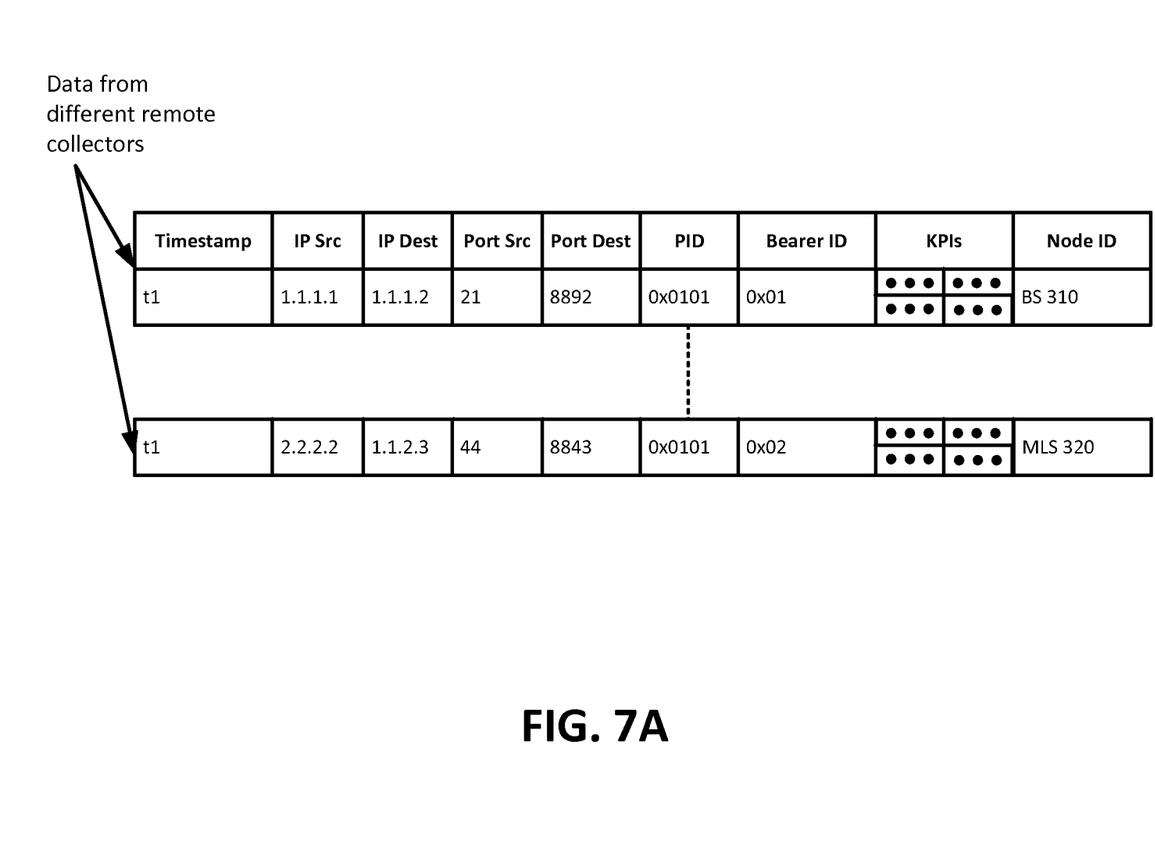
FIGS. 7A and 7B conceptually illustrate an example of how performance information may be aggregated.
Figure 7B:
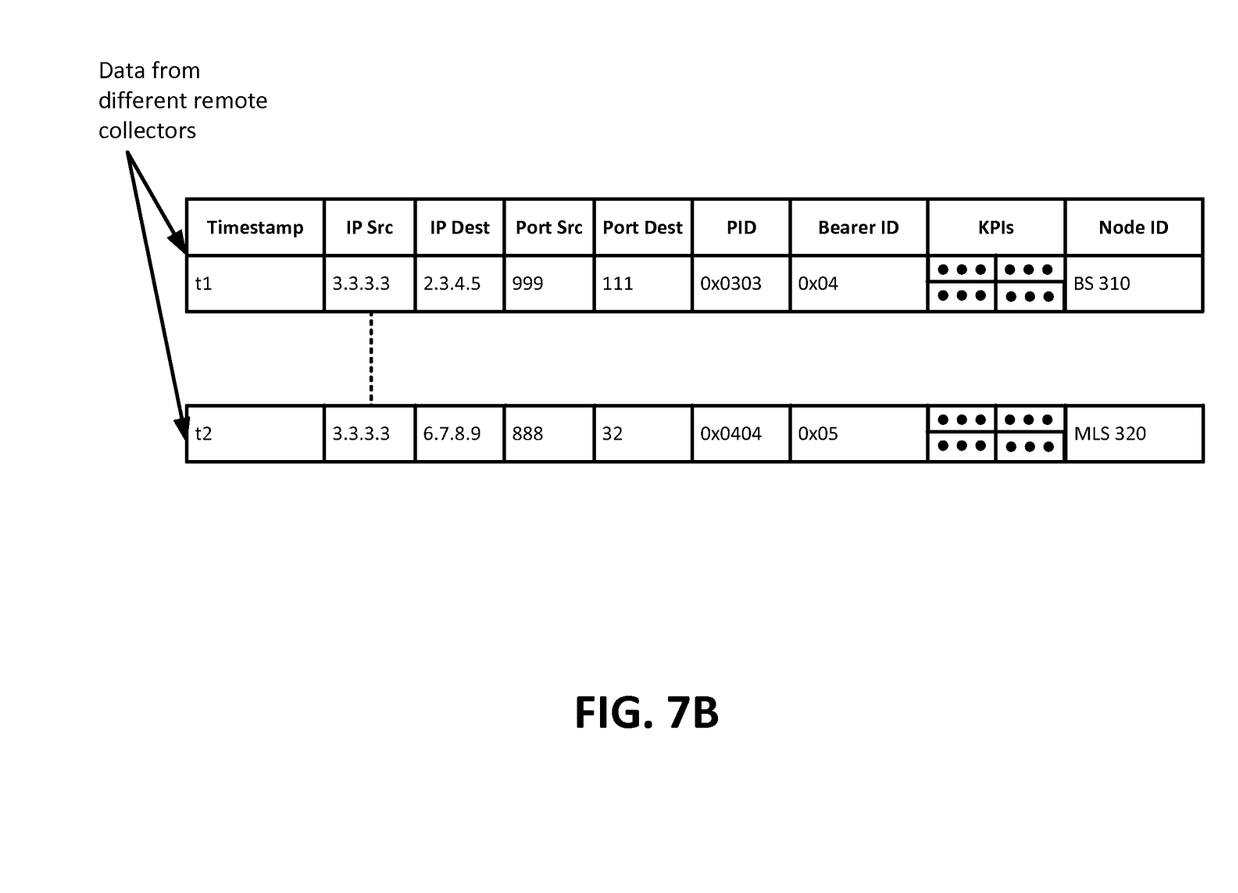

Process 600 may also include aggregating the received data (block 610). For example, analytics engine 360 may correlate the data received from multiple remote collectors 355, and/or from a single remote collector 355 at multiple times, in order to subsequently determine performance information. For example, as shown in FIGS. 7A and 7B, analytics engine 360 may aggregate data received from different remote collectors 355 based on one or more types of data received from remote collectors 355. For instance, as shown in FIG. 7A, analytics engine 360 may identify data received from different remote collectors 355, regarding the same packet (e.g., a packet with a PID of 0x0101). As another example, as shown in FIG. 7B, analytics engine 360 may identify data received from different remote collectors 355, regarding packets received from a single source (e.g., the same source IP address).

While FIGS. 7A and 7B illustrate some examples of correlating data, analytics engine 360 may correlate the data in other ways. For example, analytics engine 360 may correlate data by identifying data, received from different remote collectors 355, that relates to the same timestamp, the same source and/or destination IP address (or range of IP addresses), the same source and/or destination port (or range of ports), the same bearer identifier (or range of bearer identifiers), other types of data, and/or combinations (e.g., two or more) of the above types of data and/or other types of data. In some implementations, analytics engine 360 may aggregate the data into a cube-type data structure, where multiple types of data are correlated.

Returning to FIG. 6, process 600 may further include determining PKIs based on the aggregated data (block 615). For example, assume that analytics engine 360 identifies (at block 310) data relating to the same PID (e.g., as shown in FIG. 7A). Based on this data, analytics engine 360 may trace the path of the packet through multiple network segments. Based on this traced path, analytics engine 360 may identify, for instance, latencies associated with different network segments. For instance, by identifying a time at which base station 310 outputs a packet with a particular PID and a time at which MLS 320 receives the packet with the same PID, analytics engine 360 may identify a latency associated with backhaul network 315.

As another example, analytics engine 360 may determine, based on PIDs and timestamps, that a particular was lost on a particular network segment. For instance, analytics engine 360 may determine that a particular packet, sent or received by a particular network device, was lost if it was not received by another particular network device within a particular amount of time.

As yet another example, analytics engine 360 may determine that a particular network segment or device is faulty based on PKI information received from one or more remote collectors 355. For instance, if a particular remote collector 355 alerts analytics engine 360 that at least a threshold quantity of packets have been lost, analytics engine 360 may determine that a network segment associated with the particular remote collector 355 is faulty.

As a further example, assume that analytics engine 360 identifies (at block 310) data relating to the same source IP address (e.g., as shown in FIG. 7B). Analytics engine 360 may determine KPI information based on an amount of traffic sent from the source IP address, such as an amount of bandwidth consumed on behalf of the source IP address, and/or end-to-end latency of packets associated with the source IP address (e.g., based on tracking packets, associated with the source IP address, based on PIDs). While some examples of types of KPIs are discussed above, in practice, additional or different types of KPIs may be able to be determined by analytics engine 360.

Process 600 may additionally include storing or outputting the KPI information (block 620). For example, analytics engine 360 may output some or all of the KPI information (determined at block 615) to one or more devices, which may output the KPI information via a user interface. In some implementations, analytics engine 360 may output some or all of the KPI information to one or more repositories, which may store the KPI information for later analysis or presentation. For example, a report, relating to the performance of the backhaul network, may be generated. The report may be used by network administrators to monitor and/or optimize the backhaul network. As another example, one or more network parameters may be changed automatically based on the KPI information (determined at block 615). For instance, if bandwidth consumed by a particular user device exceeds a threshold bandwidth, the amount of bandwidth allocated to that user device may be adjusted.

Figure 8:
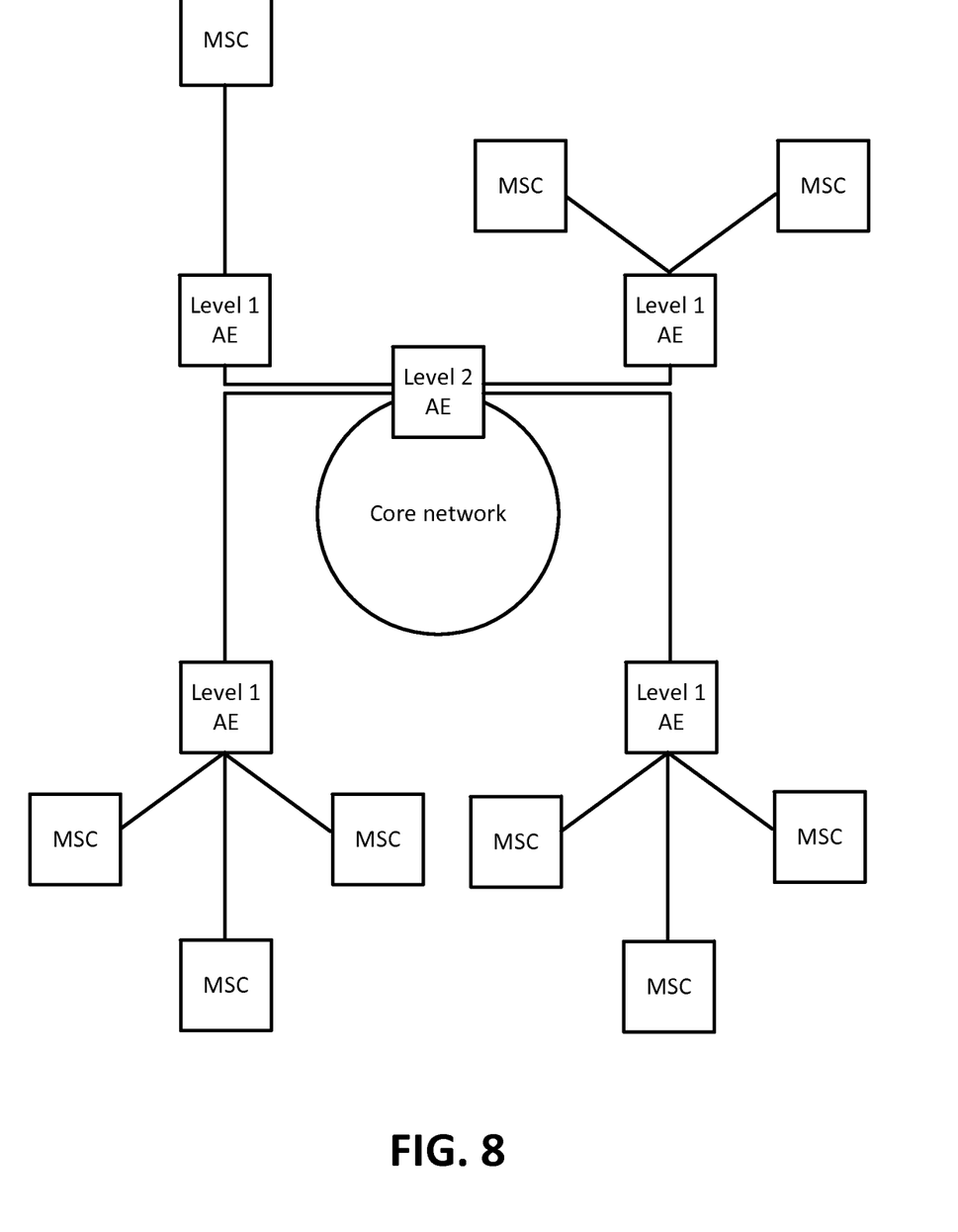
FIG. 8 illustrates an example of a hierarchical organization of multiple analytics engines.

FIG. 8 illustrates an example of a hierarchical organization of multiple analytics engines. For example, as shown, multiple analytics engines may each be associated with one or more mobile switching centers ("MSCs") of a network (shown in the figure as "Level 1 AEs"). Each of these level 1 analytics engines may be associated with a particular sub-network (e.g., one or more RANs) that is associated with the respective MSC(s). In some implementations, the multiple level 1 analytics engines may be deployed based on geographic regions. For instance, one level 1 analytics engine may be deployed in the northwest of the United States, another level 1 analytics engine may be deployed in the southwest of the United States, another level 1 analytics engine may be deployed in the northeast of the United States, and so on.

The level 1 analytics engines may receive information from remote collectors associated with the respective sub-networks, and may determine PKI information associated with the respective sub-networks. The level 1 analytics engines may, in some implementations, output PKI information to a centralized analytics engine (shown in FIG. 8 as a "Level 2 AE"). For instance, in some implementations, level 1 analytics engines may output PKI information to the level 2 analytics engine only when particular thresholds, with respect to PKIs, are met. In some implementations, level 1 analytics engines may output all PKI information to the level 2 analytics engine, as the level 1 analytics engines receive or generate the PKI information. In this sense, the level 2 analytics engine may perform a process similar to the one shown in FIG. 6, with the exception that the data may be received (at block 605) from other analytics engines.

Figure 9:
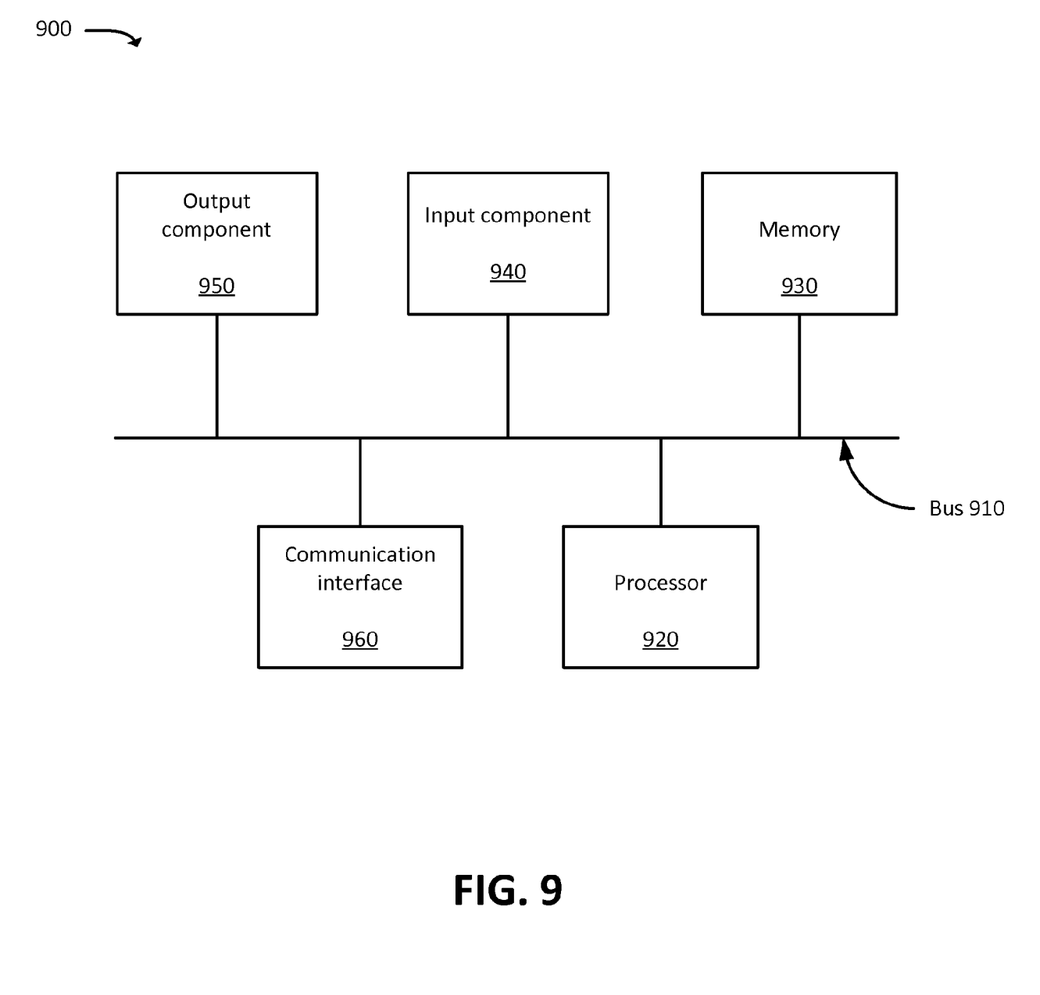
FIG. 9 illustrates example components of one or more devices shown in FIGS. 1-3.

FIG. 9 is a diagram of example components of device 900. One or more of the devices illustrated in FIGS. 1-3 may include one or more devices 900. Device 900 may include bus 910, processor 920, memory 930, input component 940, output component 950, and communication interface 960. In another implementation, device 900 may include additional, fewer, different, or differently arranged components.

Bus 910 may include one or more communication paths that permit communication among the components of device 900. Processor 920 may include a processor, microprocessor, or processing logic that may interpret and execute instructions. Memory 930 may include any type of dynamic storage device that may store information and instructions for execution by processor 920, and/or any type of non-volatile storage device that may store information for use by processor 920.

Input component 940 may include a mechanism that permits an operator to input information to device 900, such as a keyboard, a keypad, a button, a switch, etc. Output component 950 may include a mechanism that outputs information to the operator, such as a display, a speaker, one or more light emitting diodes ("LEDs"), etc.

Communication interface 960 may include any transceiver-like mechanism that enables device 900 to communicate with other devices and/or systems. For example, communication interface 960 may include an Ethernet interface, an optical interface, a coaxial interface, or the like. Communication interface 960 may include a wireless communication device, such as an infrared ("IR") receiver, a Bluetooth radio, or the like. The wireless communication device may be coupled to an external device, such as a remote control, a wireless keyboard, a mobile telephone, etc. In some embodiments, device 900 may include more than one communication interface 960. For instance, device 900 may include an optical interface and an Ethernet interface.

Device 900 may perform certain operations relating to one or more processes described above. Device 900 may perform these operations in response to processor 920 executing software instructions stored in a computer-readable medium, such as memory 930. A computer-readable medium may be defined as a non-transitory memory device. A memory device may include space within a single physical memory device or spread across multiple physical memory devices. The software instructions may be read into memory 930 from another computer-readable medium or from another device. The software instructions stored in memory 930 may cause processor 920 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations. For example, while a series of blocks has been described with regard to FIGS. 4 and 6, the order of the blocks may be modified in other implementations. Further, non-dependent blocks may be performed in parallel.

The actual software code or specialized control hardware used to implement an embodiment is not limiting of the embodiment. Thus, the operation and behavior of the embodiment has been described without reference to the specific software code, it being understood that software and control hardware may be designed based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

No element, act, or instruction used in the present application should be construed as critical or essential unless explicitly described as such. Also, as used herein, the article "a" is intended to include one or more items, and may be used interchangeably with the phrase "one or more." Where only one item is intended, the term "one" or similar language is used. Further, the phrase "based on" is intended to mean "based, at least in part, on" unless explicitly stated otherwise.

What is claimed is:

1. A method, comprising:
   monitoring, by a collector device, traffic associated with a network device;
   determining, by the collector device, a time at which a particular portion of the traffic was received by the network device;
   identifying, by the collector device, one or more attributes associated with the particular portion of the traffic;
   determining, by the collector device, one or more performance indicators associated with the particular portion of the traffic;
   determining, by the collector device, whether an alert threshold, relating to the traffic, has been met, the determining being based on at least one of:
      the one or more attributes associated with the particular portion of the traffic, and
      the one or more performance indicators associated with the particular portion of the traffic; and
   outputting, based on determining that the alert threshold has been met, and by the collector device, information regarding:
      the time at which the particular portion of the traffic was received by the network device,
      the one or more attributes associated with the particular portion of the traffic, and
      the one or more performance indicators associated with the particular portion of the traffic.

2. The method of claim 1, where outputting the information includes:
   outputting the information to an analytics engine that determines performance information based on information received from a plurality of collector devices.
3. The method of claim 2, wherein the analytics engine determines performance characteristics of a backhaul network based on the outputted information.
4. The method of claim 3, wherein the analytics engine determines the performance of the backhaul network without generating test packets to be sent via the backhaul network.
5. The method of claim 1, wherein the particular portion of the traffic comprises one or more data packets associated with the traffic.
6. The method of claim 1, wherein the traffic attributes comprise at least one of:
   a source address,
   a destination address,
   a source port,
   a destination port,
   a bearer identifier, and
   a packet identifier.
7. The method of claim 1, wherein the one or more performance indicators include information regarding at least one of:
   packet fragmentation,
   packet jitter,
   throughput,
   latency,
   availability in terms of percentage of up-time,
   packet loss, and
   committed burst size as a function of committed information rate or throughput.
8. A collector device, comprising:
   a memory device to store a set of computer-executable instructions; and
   one or more processors to execute the computer-executable instructions, to:
      monitor traffic associated with a network device;
      determine a time at which a particular portion of traffic was received by the network device;
      identify one or more attributes associated with the particular portion of the traffic;
      determine one or more performance indicators associated with the particular portion of the traffic;
      determine that an alert threshold has been met, the determining being based on at least one of:
         the one or more attributes associated with the particular portion of the traffic, and
         the one or more performance indicators associated with the particular portion of the traffic; and
      output, based on determining that the alert threshold has been met, information regarding:
         the time at which the particular portion of the traffic was received by the network device,
         the one or more attributes associated with the particular portion of the traffic, and
         the one or more performance indicators associated with the particular portion of the traffic.
9. The collector device of claim 8, where when outputting the information, the one or more processors are to:
   output the information to an analytics engine that determines performance information based on information received from a plurality of collector devices.
10. The collector device of claim 9, wherein the analytics engine determines performance characteristics of a backhaul network based on traffic sent or received by user devices.
11. The collector device of claim 10, wherein the analytics engine determines the performance of the backhaul network without generating test packets to be sent via the backhaul network.
12. The collector device of claim 8, wherein the particular portion of the traffic comprises one or more data packets associated with the traffic.
13. The collector device of claim 8, wherein the traffic attributes comprise at least one of:
   a source address,
   a destination address,
   a source port,
   a destination port,
   a bearer identifier, and
   a packet identifier.
14. The collector device of claim 8, wherein the one or more performance indicators include information regarding at least one of:
   packet fragmentation,
   packet jitter,
   throughput, and
   latency.
15. A non-transitory computer-readable medium storing a set of processor-executable instructions, which, when executed by a processor of a device, cause the device to:
   monitor traffic associated with a network device;
   determine a time at which a particular portion of traffic was received by the network device;
   identify one or more attributes associated with the particular portion of the traffic;
   determine one or more performance indicators associated with the particular portion of the traffic;
   determine that an alert threshold has been met, the determining being based on at least one of:
      the one or more attributes associated with the particular portion of the traffic, and
      the one or more performance indicators associated with the particular portion of the traffic; and
   output, based on determining that the alert threshold has been met, information regarding:
      the time at which the particular portion of the traffic was received by the network device,
      the one or more attributes associated with the particular portion of the traffic, and
      the one or more performance indicators associated with the particular portion of the traffic.
16. The non-transitory computer-readable medium of claim 15, where the processor-executable instructions, to output the information, include processor-executable instructions to:
   output the information to an analytics engine that determines performance information based on information received from a plurality of collector devices.
17. The non-transitory computer-readable medium of claim 16, wherein the analytics engine determines performance characteristics of a backhaul network based on traffic sent or received by user devices.
18. The non-transitory computer-readable medium of claim 17, wherein the analytics engine determines the performance of the backhaul network without generating test packets to be sent via the backhaul network.
19. The non-transitory computer-readable medium of claim 15, wherein the particular portion of the traffic comprises one or more data packets associated with the traffic.

20. The non-transitory computer-readable medium of claim 15, wherein the traffic attributes comprise at least one of:
- a source address,
- a destination address,
- a source port,
- a destination port,
- a bearer identifier, and
- a packet identifier.

* * * * *